United States Patent
Wittberg et al.

(10) Patent No.: US 9,900,928 B2
(45) Date of Patent: Feb. 20, 2018

(54) USER EQUIPMENT, NETWORK NODE, AND METHODS FOR MANAGING AN EXTENDED DISCONTINUOUS RECEPTION CYCLE MODE

(71) Applicant: Telefonaktiebolaget L M Ericsson (publ), Stockholm (SE)

(72) Inventors: Mikael Wittberg, Uppsala (SE); Anna Larmo, Espoo (FI); Walter Müller, Upplands Väsby (SE); Tuomas Tirronen, Helsinki (FI); Emre Yavuz, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 141 days.

(21) Appl. No.: 14/781,153

(22) PCT Filed: Apr. 3, 2014

(86) PCT No.: PCT/SE2014/050411
§ 371 (c)(1),
(2) Date: Sep. 29, 2015

(87) PCT Pub. No.: WO2014/163573
PCT Pub. Date: Oct. 9, 2014

(65) Prior Publication Data
US 2016/0057806 A1    Feb. 25, 2016

Related U.S. Application Data

(60) Provisional application No. 61/808,666, filed on Apr. 5, 2013.

(51) Int. Cl.
*H04W 4/00* (2009.01)
*H04W 76/04* (2009.01)
(Continued)

(52) U.S. Cl.
CPC ..... *H04W 76/048* (2013.01); *H04W 52/0216* (2013.01); *H04W 68/005* (2013.01); *Y02B 60/50* (2013.01)

(58) Field of Classification Search
CPC ............ H04W 76/048; H04W 68/005; H04W 52/0216; Y02B 60/50
See application file for complete search history.

(56) References Cited

U.S. PATENT DOCUMENTS 8,285,346 B2 * 10/2012 Fodor ............... H04W 52/0216
370/311
2003/0144020 A1   7/2003 Challa et al.
(Continued)

FOREIGN PATENT DOCUMENTS

EP    0788255 A2    8/1997
EP    2696629 A1    2/2014
(Continued)

OTHER PUBLICATIONS (RRC protocol states, Ericsson, TSG-RAN Working Group 2, Sophia Antipolis, Aug. 16-20, 1999).*
(Continued)

*Primary Examiner* — Afshawn Towfighi
(74) *Attorney, Agent, or Firm* — Coats & Bennett, PLLC

(57) ABSTRACT

A method in a User Equipment, UE, for managing an extended Discontinuous Reception, DRX, cycle mode. The UE is operating in a network and is in a Radio Resource Control, RRC, connected state. The UE enters (401) the extended DRX cycle mode when a first criterion is satisfied. The first criterion relates to anyone or more out of that the UE has not been scheduled by the network during a specific time duration, that the UE has completed a predefined or configured number of long DRX cycles when being in a long (Continued)

DRX cycle mode, that the UE has received an order from the network to enter to the extended DRX cycle mode.

19 Claims, 15 Drawing Sheets

(51) Int. Cl.
*H04W 52/02* (2009.01)
*H04W 68/00* (2009.01)

(56) References Cited

U.S. PATENT DOCUMENTS

| | | | |
|---|---|---|---|
| 2012/0120993 | A1 | 5/2012 | Lin et al. |
| 2012/0252517 | A1 | 10/2012 | Karampatsis et al. |
| 2012/0257522 | A1 | 10/2012 | Adachi et al. |
| 2012/0294169 | A1 | 11/2012 | Chui et al. |
| 2013/0237257 | A1 | 9/2013 | Walke et al. |
| 2013/0301501 | A1 | 11/2013 | Olvera-Hernandez et al. |

FOREIGN PATENT DOCUMENTS

| | | | |
|---|---|---|---|
| EP | 2696630 | A1 | 2/2014 |
| EP | 2696631 | A1 | 2/2014 |
| WO | 2010033957 | A2 | 3/2010 |
| WO | 2012137294 | A1 | 10/2012 |
| WO | 2012137295 | A1 | 10/2012 |
| WO | 2012137296 | A1 | 10/2012 |
| WO | 2013164025 | A1 | 11/2013 |
| WO | 2014070077 | A1 | 5/2014 |
| WO | 2014137259 | A1 | 9/2014 |

OTHER PUBLICATIONS

3rd Generation Partnership Project, "Technical Specification Group Radio Access Network; Evolved Universal Terrestrial Radio Access (E-UTRA); Radio Resource Control (RRC); Protocol Specification (Release 11)", 3GPP TS 36.331 V11.5.0, Sep. 2013, pp. 1-347.

3rd Generation Partnership Project, "3rd Generation Partnership Project; Technical Specification Group Radio Access Network; Evolved Universal Terrestrial Radio Access (E-UTRA); Medium Access Control (MAC) protocol specification (Release 11)", Technical Specification, 3GPP TS 36.321 V11.2.0, Mar. 1, 2013, pp. 1-56, 3GPP, France.

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 11)", Technical Specification, 3GPP TS 36.331 V11.3.0, Mar. 1, 2013, pp. 1-344, 3GPP, France.

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", Technical Specification, 3GPP TS 36.300 V11.5.0, Mar. 1, 2013, pp. 1-209, 3GPP, France.

3rd Generation Partnership Project, "3rd Generation Partnership Project; Technical Specification Group Radio Access Network; Evolved Universal Terrestrial Radio Access (E-UTRA); Requirements for support of radio resource management (Release 11)", Technical Specification, 3GPP TS 36.133 V11.4.0, Mar. 1, 2013, pp. 1-676, 3GPP, France.

\* cited by examiner

USER EQUIPMENT, NETWORK NODE, AND METHODS FOR MANAGING AN EXTENDED DISCONTINUOUS RECEPTION CYCLE MODE

TECHNICAL FIELD

Embodiments herein relate to a user equipment and a network node, and to methods in the user equipment and the network node. In particular they relate to managing an extended Discontinuous Reception cycle mode.

BACKGROUND

Communication devices such as wireless devices are also known as e.g. user equipments (UE), mobile terminals, wireless terminals, and/or mobile stations. Wireless devices are enabled to communicate wirelessly in a cellular communications network or wireless communication system, sometimes also referred to as a cellular radio system or cellular networks. The communication may be performed e.g. between two wireless devices, between a wireless device and a regular telephone and/or between a wireless device and a server via a Radio Access Network (RAN) and possibly one or more core networks, comprised within the cellular communications network.

Wireless devices may further be referred to as mobile telephones, cellular telephones, laptops, tablet computers or surf plates with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another wireless device or a server.

The cellular communications network covers a geographical area which is divided into cell areas, wherein each cell area being served by a radio network node. A cell is the geographical area where radio coverage is provided by the radio network node.

The radio network node may e.g. be a base station such as a Radio Base Station (RBS), eNB, eNodeB, NodeB, B node, or Base Transceiver Station (BTS), depending on the technology and terminology used. The base stations may be of different classes such as e.g. macro eNodeB, home eNodeB or pico base station, based on transmission power and thereby also cell size.

Further, each radio network node may support one or several communication technologies. The radio network nodes communicate over the air interface operating on radio frequencies with the wireless terminals within range of the radio network node. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

Discontinuous Reception (DRX) is a known technique in telecommunications for reducing the power consumption of a UE such as a mobile terminal or a Machine-Type-Communication (MTC) device. A UE may have two Radio Resource Control (RRC) states, an RRC_CONNECTED state and an RRC_IDLE state. When the DRX functionality is configured, a UE is allowed to monitor a downlink control channel discontinuously. During each DRX cycle, a UE wakes up at least once to monitor the downlink control channel. DRX cycles of different lengths are defined, for example, a DRX long cycle, a DRX short cycle, and an idle_mode DRX cycle. A UE often supports DRX long and short cycles when in an RRC_CONNECTED state, and a UE often supports idle_mode DRX cycles when in an RRC_IDLE state.

Separate mobility schemes are defined for the RRC_IDLE state and the RRC_CONNECTED states respectively, see also the 3GPP Technical Specification (TS) 36.300, Release 11, Section 10. When a UE is in an RRC_CONNECTED state, the mobility scheme is referred to as a network-controlled mobility scheme, which is based on network-controlled UE-assisted handovers. The network-controlled mobility scheme supports the currently specified DRX long cycles ranging from 10 ms to 2560ms. When a UE in RRC_CONNECTED state needs to communicate with a network, such as with a network node comprised in the network, the network will schedule the UE on the Physical Downlink Control Channel (PDCCH) for an Uplink (UL) grant, a Downlink (DL) assignment, or ordering the UE to perform a Random Access.

When a UE is in an RRC_IDLE state, the mobility scheme is referred to as a terminal-controlled mobility scheme, which is based on cell reselections. The terminal-controlled mobility scheme supports the currently specified idle_mode DRX cycles ranging from 320 ms to 2560 ms. When the network needs to reach a UE that is in RRC_IDLE state, the network will page the UE at specific times on the PDCCH when the UE is scheduled to tune in to that channel for paging messages. Paging is used for network-initiated connection setup when the UE is in an RRC_IDLE state.

Both mobility schemes require periodic measurements to be performed. In RRC_IDLE, DRX usage is assumed and all requirements are related to the idle mode DRX cycle. In RRC_CONNECTED, both DRX usage and non-DRX usage are supported. Radio Resource Management (RRM) requirements are different for DRX usage and non-DRX usage, respectively. As an example, RRM requirements may relate to how often the measurements should be performed. In practice, when a UE or a MTC type device supports DRX, the measurement times are scaled with the DRX long cycles so that it is possible to perform measurements only when the device is in DRX active state, i.e. awake. Furthermore, a more complete definition on when the non-DRX requirement is applied, is formulated based on which DRX timers are running, and what recent events have happened. See 3GPP TS 36.133, Release 11, Section 5.

However, when DRX long cycles are further extended for MTC type traffic, current implementations may be incompatible with the measurement times, when the measurement times are being scaled with the DRX long cycles. The scaled measurement times may cause Radio Link Failures (RLFs) or increased signaling between a UE and a network node during handover. Furthermore, the frequent signaling required by current implementations may result in high UE battery usage.

SUMMARY

It is therefore an object of embodiments herein to improve mobility associated with DRX.

According to a first aspect of embodiments herein, the object is achieved by a method in a User Equipment, UE, for managing an extended Discontinuous Reception, DRX, cycle mode. The UE is operating in a network and is in a Radio Resource Control, RRC, connected state. The UE enters the extended DRX cycle mode when a first criterion is satisfied. The first criterion relates to anyone or more out of that the UE has not been scheduled by the network during a specific time duration, that the UE has completed a predefined or configured number of long DRX cycles when being in a long DRX cycle mode, that the UE has received an order from the network to enter to the extended DRX cycle mode.

According to a second aspect of embodiments herein, the object is achieved by a User Equipment, UE, for managing an extended DRX cycle mode. The UE is operating in a network and is in a RRC connected state. The UE is configured to enter the extended DRX cycle mode when a first criterion is satisfied. The first criterion relates to anyone or more out of that the UE has not been scheduled by the network during a specific time duration, that the UE has completed a predefined or configured number of long DRX cycles when being in a long DRX cycle mode, that the UE has received an order from the network to enter to the extended DRX cycle mode.

According to a third aspect of embodiments herein, the object is achieved by a method in a network node for managing an extended DRX cycle mode of a UE. The UE is in a RRC connected state with the network node. The network node configures the UE relating to a behavior of the UE while it is in the extended DRX cycle mode.

According to a fourth aspect of embodiments herein, the object is achieved by a network node for managing an extended DRX cycle mode of a UE. The UE is in a RRC connected state with the network node. The network node is configured to configure the UE relating to a behavior of the UE while it is in the extended DRX cycle mode.

An advantage with embodiments herein is that the provision of a new DRX cycle mode, the extended DRX cycle mode, the behavior of the UE may be adapted to situations in which none of the previously known DRX cycle modes are optimal, due to too much energy usage and too much signaling

BRIEF DESCRIPTION OF THE DRAWINGS

Examples of embodiments herein are described in more detail with reference to the attached drawings in which.

DETAILED DESCRIPTION

As part of developing embodiments herein, some problems will first be identified and discussed.

Different DRX configurations have been defined. A UE may be configured without any DRX, or it may be configured with different DRX configurations to save battery. Currently, the DRX sleep state and the state when the UE is in Active Time, i.e., the UE must be active to listen on PDCCH, are two separate states. See 3GPP TS 36.321 Version 11.2.0, Release 11, Section 5.7. For the performance requirements specified hereafter, the state when the UE is in Active Time and the DRX sleep state are defined as follows:

When no DRX cycle is configured, the UE is in Active Time.

When a DRX cycle is configured, the Active Time includes the time while:
 a drx-InactivityTimer is running; or
 a drx-RetransmissionTimer is running; or
 a mac-ContentionResolutionTimer is running; or
 a Scheduling Request sent on Physical Uplink Control Channel (PUCCH) is pending; or
 an Uplink grant for a pending Hybrid Automatic Repeat Request (HARQ) retransmission can occur and there is data in the corresponding HARQ buffer; or
 a PDCCH indicating a new transmission addressed to the Cell Radio Network Temporary Identifier (C-RNTI) of the UE has not been received after successful reception of a Random Access Response for the explicitly signaled preamble, only applicable to UEs in RRC_CONNECTED.

For other times, the DRX sleep state is used. See 3GPP TS 36.321 Version 11.2.0, Release 11, Section 5.7.

A UE may be configured without DRX. A UE is normally in Active Time and listening on the PDCCH channel without any periods of sleep. When the UE recognizes itself to be in this state, the RRM measurement procedures follow the no-DRX configuration, often resulting in more frequent measurement sampling.

A UE may also be configured with either Long or Short DRX cycles. A UE listens on PDCCH channel when in Active Time, but may be sleeping when not in Active Time. This time of inactivity is specified below as 'sleep state'. The UE may be in short or long DRX state; and in each DRX state it may either be in 'Active Time' or in 'sleep state', where 'Active Time' and 'sleep state' can be considered as sub-states to the long and short DRX cycle modes respectively. While in 'sleep state,' the UE will be sleeping in short DRX cycle or in long DRX cycle depending on for how long time it has been inactive.

Figure 1:
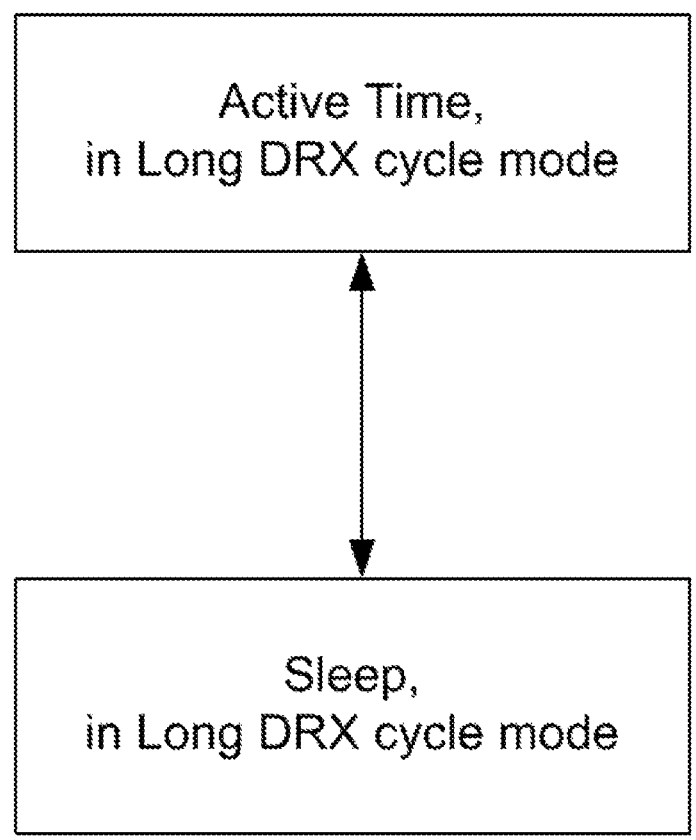
FIG. 1 illustrates exemplary DRX state changes when only a long DRX cycle mode has been configured.
Figure 2:
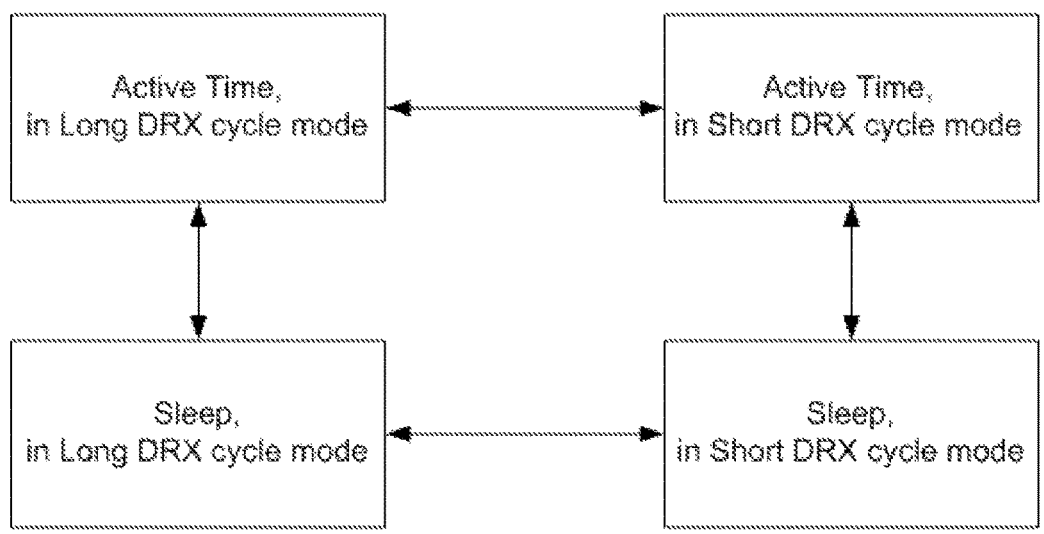
FIG. 2 illustrates exemplary DRX state changes when both short and long DRX cycle modes have been configured.

As shown in FIG. 1 and FIG. 2, a UE in RRC_CONNECTED state and which have been configured with the DRX function can be in different DRX states. FIG. 1 shows the case when only long DRX has been configured and FIG. 2 shows the case when both short and long DRX have been configured. The short and long DRX are herein referred to as the legacy DRX.

The DRX state, e.g., sleep or active, and DRX cycle mode, e.g., long or short cycle mode, of a UE affects the UE's periodic Channel State Information (CSI) and Sounding Reference Signal (SRS) reporting. A UE may be may be configured to transmit periodic CSI with a certain periodicity to report the channel quality in DL to an evolved NodeB (eNB). The UE may also be configured to transmit periodic SRS with a certain periodicity. This SRS signal can be used by the eNB to estimate the UL channel quality for the UE. The reporting of the periodic CSI/SRS may, according to the Medium Access Control (MAC) standard in 3GPP TS 36.321 Version 11.2.0, Release 11, be done only when the UE is in Active Time.

The DRX state and DRX cycle mode of a UE also affect the UE's measurements reporting. A UE may be configured to perform measurements on other cells and frequencies, and these measurements may be reported to the eNB either as periodical reports or single events according to certain criteria. See RRC specification, 3GPP TS 36.331 version 11.3.0 Release 11, Section 5.5. The purpose of these measurements and reports is to support mobility for the UE by notifying the eNB about the current set of neighboring cells.

A drawback of the network-controlled mobility is that the time to gather the needed number of measurement samples to recognize, e.g., out-of-synch situations leading to Radio Link Failure (RLF) becomes longer as the DRX cycle becomes longer. Already today, it has been recognized that the longest specified DRX long cycle values are too long to support connected mode mobility without radio link failures whenever the mobile speed is above a certain level, e.g., speeds over 100 km/h in an environment where the cells have radius of approximately 166 meters.

Another drawback with the network-controlled mobility is that a handover procedure must be executed whenever the UE needs to change its serving cell. The handover procedure will require signaling between the eNB and the UE, and UE battery power will be used for carrying out this procedure. For each handover there is also a need to perform signaling between the eNB and the core network to update the current serving cell in the core network.

In case DRX long cycles are further extended for MTC traffic, the problems described above will only worsen. Thus, solutions can be developed to accommodate the extended DRX cycles with values longer than what is possible today. The UE or MTC device follows the mobility procedures that have been agreed for the current state. With the possible introduction of longer DRX cycles for connected mode, to better serve MTC devices, the current network-controlled mobility mechanism for RRC_CONNECTED state might not be the best option for handling mobility for these devices.

To minimize the need for signaling and to save battery for a UE in RRC_CONNECTED state it may be beneficial to use the DRX state of the UE to determine whether the UE shall use network-controlled mobility or terminal-controlled mobility. Embodiments herein provide a type of DRX cycle mode called the 'extended DRX cycle mode'. The purpose of introducing a new DRX mode is to minimize the need for signaling while the UE is in the extended DRX cycle mode, and also to allow longer DRX cycle lengths than what is possible in the legacy standard using long DRX cycle mode.

Figure 3:
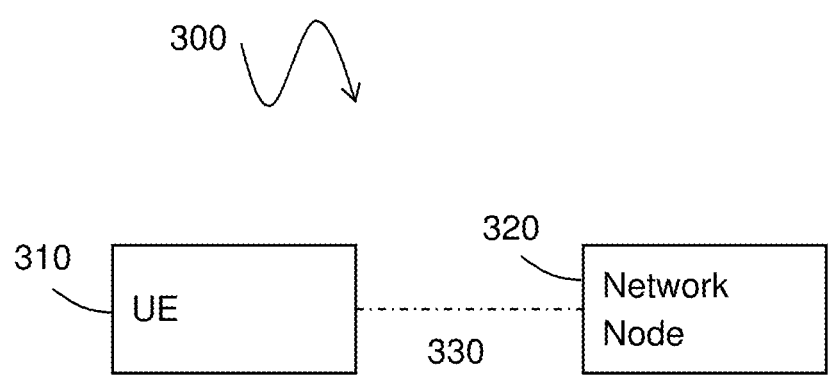
FIG. 3 schematically illustrates embodiments of a wireless communications network.

FIG. 3 depicts an example of a network 300 in which embodiments herein may be implemented. The network 300 may be a Long Term Evolution (LTE) network or any other wireless communications network in which embodiments herein may be implemented.

A UE 310 operates in the network 300. The UE 310 may e.g. be a mobile terminal or an MTC device. The UE 310 may also be a laptop, a tablet computer or a surf plate with wireless capability, just to mention some further examples. The UE 310 in the present context may be, for example, portable, pocket-storable, hand-held, computer-comprised, or vehicle-mounted mobile devices, enabled to communicate voice and/or data, via the RAN, with another entity, such as another wireless device or a server.

The UE 310 is connected to a network node 320 via a radio air interface 330. The network node 320 may may e.g. be a base station such as a Radio Base Station (RBS), eNB, eNodeB, NodeB, B node, or Base Transceiver Station (BTS), depending on the technology and terminology used. The base stations may be of different classes such as e.g. macro eNodeB, home eNodeB or pico base station, based on transmission power and thereby also cell size.

Figure 4:
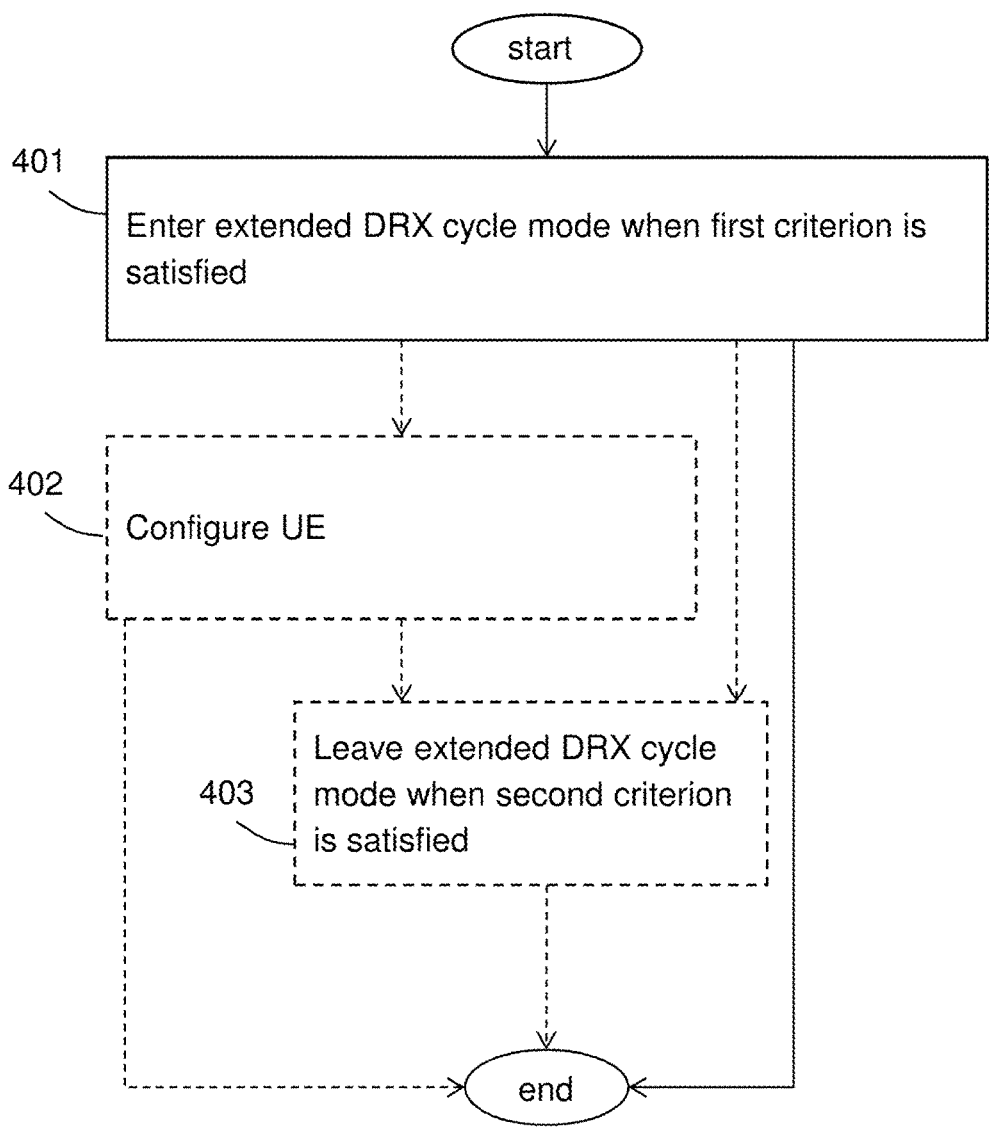
FIG. 4 is a flowchart depicting embodiments of a method in a UE.

Example embodiments of a method in a UE 310 for managing an extended DRX cycle mode, will now be described with reference to a flowchart depicted in FIG. 4. The method comprises the following actions, which actions may be taken in any suitable order. Dashed lines of some boxes in FIG. 4 indicate that the corresponding action is not mandatory. First, the method is described in a general way, here as seen from the UE's 310 point of view, relating to FIG. 4. Then, the method will be described as seen from the network node's 320 point of view, relating to FIG. 5. The method will then be described in more detail below.

The UE 310 operates in the network 300 and is in a Radio Resource Control, RRC, connected state, such as the RRC_CONNECTED state. This means that the UE 310 is connected to the network node 320, such as an eNB.

Action 401

According to embodiments herein, the UE 310 transfers to a new type of DRX cycle mode, called an extended DRX cycle mode. The extended DRX cycle mode is a different mode as compared to the previously known long and short DRX cycle modes and the behavior of the UE 310 in the extended DRX cycle mode may differ from the behavior the UE 310 would adopt in the long DRX cycle mode or the short DRX cycle mode.

In order to obtain a suitable usage of the extended DRX cycle mode, a set of rules for transitions into the extended DRX cycle mode, may be pre-defined. A suitable usage of the extended DRX cycle mode implies that the UE 310 is configured to enter the extended DRX cycle mode when it is advantageous to adopt a behavior related to the extended DRX cycle mode.

These pre-defined rules may define certain criteria to be satisfied for a transition to occur.

According to embodiments herein, the UE 310 enters the extended DRX cycle mode when a first criterion is satisfied.

The first criterion relates to anyone or more out of:

that the UE 310 has not been scheduled by the network during a specific time duration, that the UE 310 has completed a predefined or configured number of long DRX cycles when being in a long DRX cycle mode, that the UE 310 has received an order from the network to enter to the extended DRX cycle mode.

In some embodiments, in which the first criterion is satisfied when the UE 310 has not been scheduled by the network during a specific time duration, the UE 310 has been in a long DRX cycle mode during the specific time duration.

In some other embodiments, in which the first criterion is satisfied when the UE 310 has not been scheduled by the network during a specific time duration, the UE 310 has been in a state which is not a DRX state during the specific time duration.

The specific time duration may be a predefined value or a configured value.

Action 402

The behavior of the UE 310 in the extended DRX cycle mode may differ from the behavior the UE 310 would adopt in the long DRX cycle mode or the short DRX cycle mode, as well as from the behavior the UE 310 would adopt in a non-DRX state.

In some embodiments, the UE 310 is thus configured relating to a behavior of the UE 310 while it is in the extended DRX cycle mode.

In some embodiments the UE 310 is configured to perform measurements and/or reporting less frequently than when the UE 310 is in another DRX cycle mode or in no DRX state. As an example, measurements for neighboring cells may be performed less frequently when the UE 310 is in the extended DRX cycle mode than when the UE 310 is in another DRX cycle mode or in no DRX state. Correspondingly CSI/SRS reporting may be performed less frequently when the UE 310 is in the extended DRX cycle mode than when the UE 310 is in another DRX cycle mode or in no DRX state.

Thereby, usage of the UE's 310 battery is reduced, and signaling is minimized.

In some embodiments, the UE 310 shall not perform any measurements and reporting at all when it is in in the extended DRX cycle mode.

In some embodiments, the UE 310 is configured to periodically listen on a control or paging channel for scheduling or paging messages while in the extended DRX cycle mode. This means that a UE 310 in extended DRX cycle mode will listen and react on pages also when it is in a RRC connected state, such as the RRC_CONNECTED state. Hence, if a UE 310 is paged by the network while the UE 310 is in extended DRX cycle mode, the UE 310 will respond in the same way as if it was paged in RRC_IDLE state. One advantage with listening on the paging channel while in RRC connected state is that if the network has lost contact with the UE, for instance because the UE has moved out of the coverage area of a cell before a handover can be executed, and the UE is still in RRC connected state, the network can contact the UE in the normal way, by sending a page message, as if the UE would be in RRC idle state. If the UE would not listen to the paging channel, the network would not be able to reach the UE until some event happens which causes the UE to go to RRC idle state.

In some embodiments, the UE 310 is configured to adopt a terminal-controlled mobility scheme when in an extended DRX cycle mode. Thereby, the above mentioned drawbacks with the network-controlled mobility scheme, which is normally used when the UE 310 is in legacy DRX state or in no DRX state, are avoided.

Action 403

In order to obtain a suitable usage of the extended DRX cycle mode, a set of rules for transitions out of the extended DRX cycle mode, may be pre-defined. These pre-defined rules may define certain criteria to be satisfied for a transition to occur.

In some embodiments, the UE 310 leaves he extended DRX cycle mode when a second criterion is satisfied. The second criterion relates to anyone or more out of:

that the UE 310 is scheduled by the network in subframes where the UE 310 is in Active Time, that the UE 310 needs to perform an uplink transmission, that the UE 310 is paged by the network.

Figure 5:
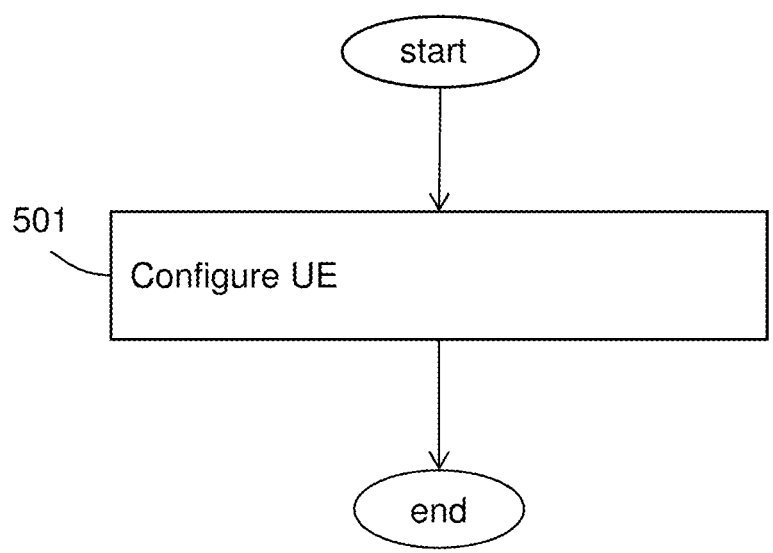
FIG. 5 is a flowchart depicting embodiments of a method in a network node.

Example embodiments of a method in the network node 320 for managing an extended DRX cycle mode of a UE 310, will now be described with reference to a flowchart depicted in FIG. 5.

Embodiments herein address scenarios in which the UE 310 is in a RRC connected state.

Action 501

The network node 320 configures the UE 310 relating to a behavior of the UE 310 while it is in the extended DRX cycle mode. In order to do this, the 320 may e.g. send a configuration to the UE 310.

In some embodiments, the network node 320 configures the UE 310 to perform measurements and/or reporting less frequently than when the UE 310 is in another DRX cycle mode or in no DRX state.

As an example, measurements for neighboring cells may be performed less frequently when the UE 310 is in the extended DRX cycle mode than when the UE 310 is in another DRX cycle mode or in no DRX state. Correspondingly CSI/SRS reporting may be performed less frequently when the UE 310 is in the extended DRX cycle mode than when the UE 310 is in another DRX cycle mode or in no DRX state.

Thereby, usage of the UE's 310 battery is reduced, and signaling is minimized.

In some embodiments, the network node 320 configures the UE 310 to perform any measurements and reporting at all when it is in in the extended DRX cycle mode.

In some embodiments, the network node 320 configures the UE 310 to periodically listen on a control or paging channel for scheduling or paging messages while in the extended DRX cycle mode. This means that a UE 310 in extended DRX cycle mode will listen and react on pages also when it is in a RRC connected state, such as the RRC_CONNECTED state. Hence, if a UE 310 is paged by the network while the UE 310 is in extended DRX cycle mode, the UE 310 will respond in the same way as if it was paged in RRC_IDLE state.

In some embodiments, the network node 320 configures the UE 310 to adopt a terminal-controlled mobility scheme when in an extended DRX cycle mode.

Thereby, the above mentioned drawbacks with the network-controlled mobility scheme, which is normally used when the UE 310 is in legacy DRX state or in no DRX state, are avoided.

Various details of some possible embodiments are discussed below.

To minimize the need for signaling and to save battery for a UE 310 in RRC_CONNECTED state it may be beneficial to use the DRX state of the UE 310 to determine whether the UE 310 shall use network-controlled mobility or terminal-controlled mobility. Embodiments herein provide a type of DRX cycle mode called the 'extended DRX cycle mode'. The purpose of introducing a new DRX mode is to minimize the need for signaling while the UE 310 is in the extended DRX cycle mode, and also to allow longer DRX cycle lengths than what is possible in the legacy standard using long DRX cycle mode.

In some embodiments, the UE 310 in extended DRX cycle mode will perform measurements for neighboring cells less frequently than when the UE 310 is in another DRX cycle mode or in no DRX state. In some embodiments, the UE 310 shall not perform any measurements and reporting at all while in extended DRX cycle mode.

A UE 310 that does not perform sufficient number of measurements or reporting may fail to successfully complete a handover when changing its serving cell, which may result in a RLF. However, there are ways to handle this situation and therefore it may not be necessary to perform measurement reporting very frequently, or at all, when the UE 310 is in extended DRX cycle mode.

The length of the extended DRX cycle should be possible to set to a very large value which may be much greater than the current maximum length of the long DRX cycle, i.e. much greater than 2560 ms. The length may be set to several minutes and even hours may be supported for UEs 310 that may tolerate some delay for network initiated access. This does not preclude using also an extended DRX cycle length equal to 2560 ms or even shorter values, because a UE 310 in extended DRX cycle mode will still benefit due to the minimized signaling required for measurements and CSI/SRS reporting This new extended DRX cycle mode may for instance be configured for UEs 310 that are MTC devices, or for any other UEs 310 which may benefit from having extended DRX cycles, or for any UEs 310 where it is beneficial to save power by not having to perform measurements or CSI/SRS reporting as frequents as when not in extended DRX cycle mode. Furthermore, some additional rules are defined for the extended DRX cycle mode that specifies when the UE 310 shall enter and leave this mode. In particular, the extended DRX cycle mode should be used when there has not been any recent data activity.

The legacy DRX cycle modes are the long DRX cycle mode and optionally also the short DRX cycle mode. Introducing a new type of DRX cycle mode, the extended DRX cycle mode, on top of the existing legacy DRX cycle modes is a logical extension for allowing a UE 310 to save more battery when being idle for a longer period of time.

Exemplary scenarios will now be described for moving UEs 310 between states, using no DRX or long/short DRX cycle mode, and states in extended DRX cycle mode. FIGS. 6a to 6e are used to illustrate the exemplary scenarios. In any DRX cycle mode the UE 310 may be in Active Time, where the UE 310 is listening on PDCCH, or in sleep state, where the UE 310 is not required to monitor PDCCH. Extended DRX may be configured for a UE 310 that is not configured with any legacy DRX. Extended DRX may also be configured for a UE 310 that is configured with a legacy DRX.

Figure 6A:
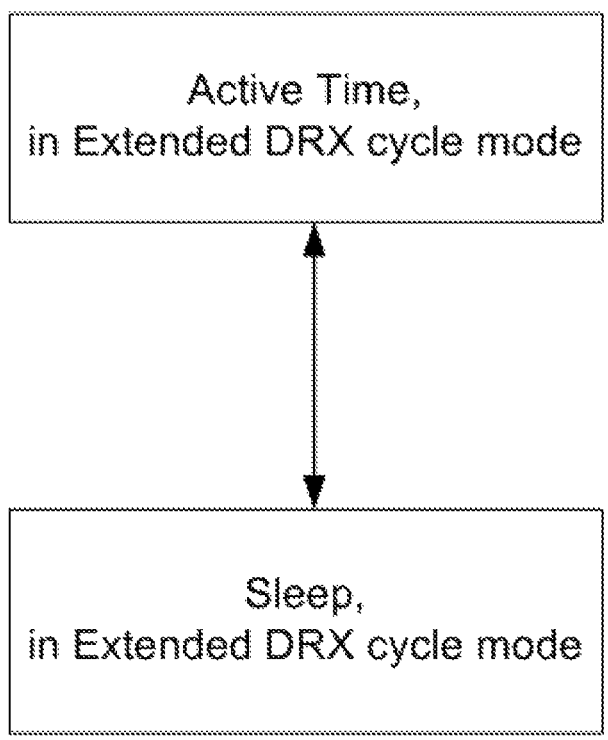
FIG. 6a illustrates exemplary DRX state changes when an extended DRX cycle mode has been configured without a legacy DRX cycle mode being configured.

FIG. 6a shows that the UE 310 may either be sleeping in extended DRX cycle mode or it may be in Active Time in extended DRX cycle mode—hence two different states within the extended DRX cycle mode.

In some embodiments—in which an extended DRX mode with periods of Active Time is used—the UE 310 is required to listen on PDCCH for certain subframes when in extended DRX cycle mode. One way to listen on PDCCH is to use cycles similar to the legacy states where each cycle starts with a period of OnDuration, during which the UE 310 will monitor PDCCH, followed by a period of sleep opportunity.

Figure 6B:
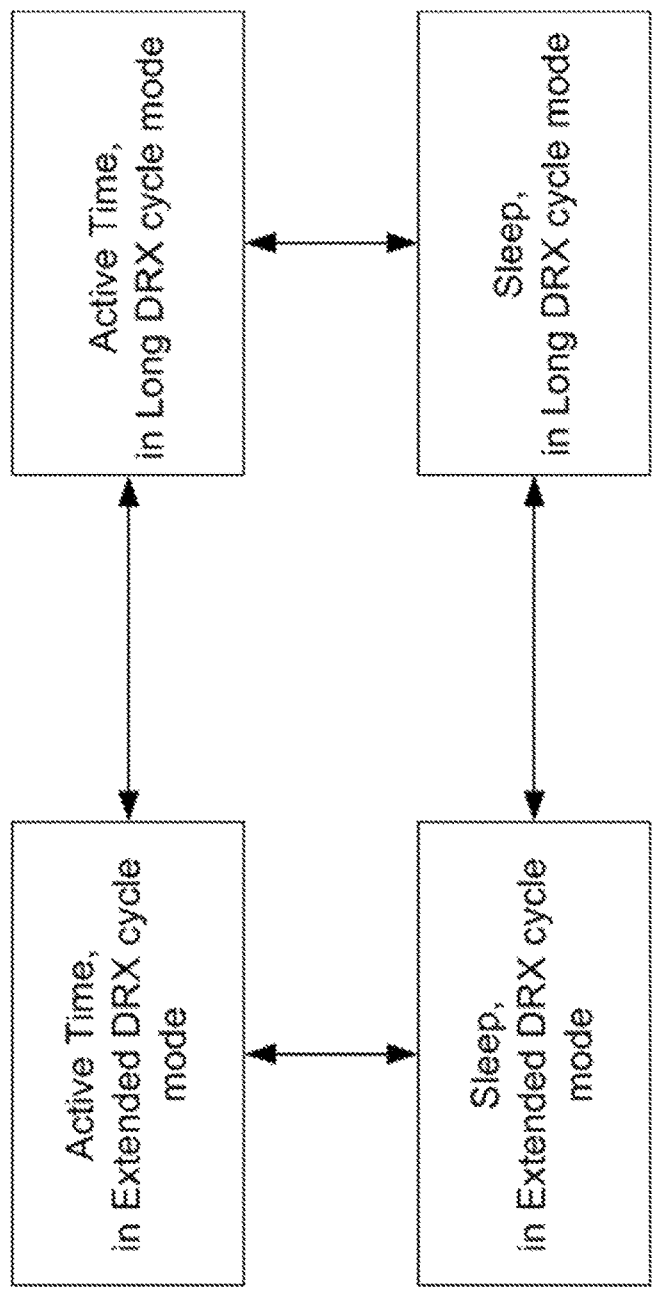
FIG. 6b illustrates exemplary DRX state changes when an extended DRX cycle mode has been configured together with a long DRX cycle mode.
Figure 6C:
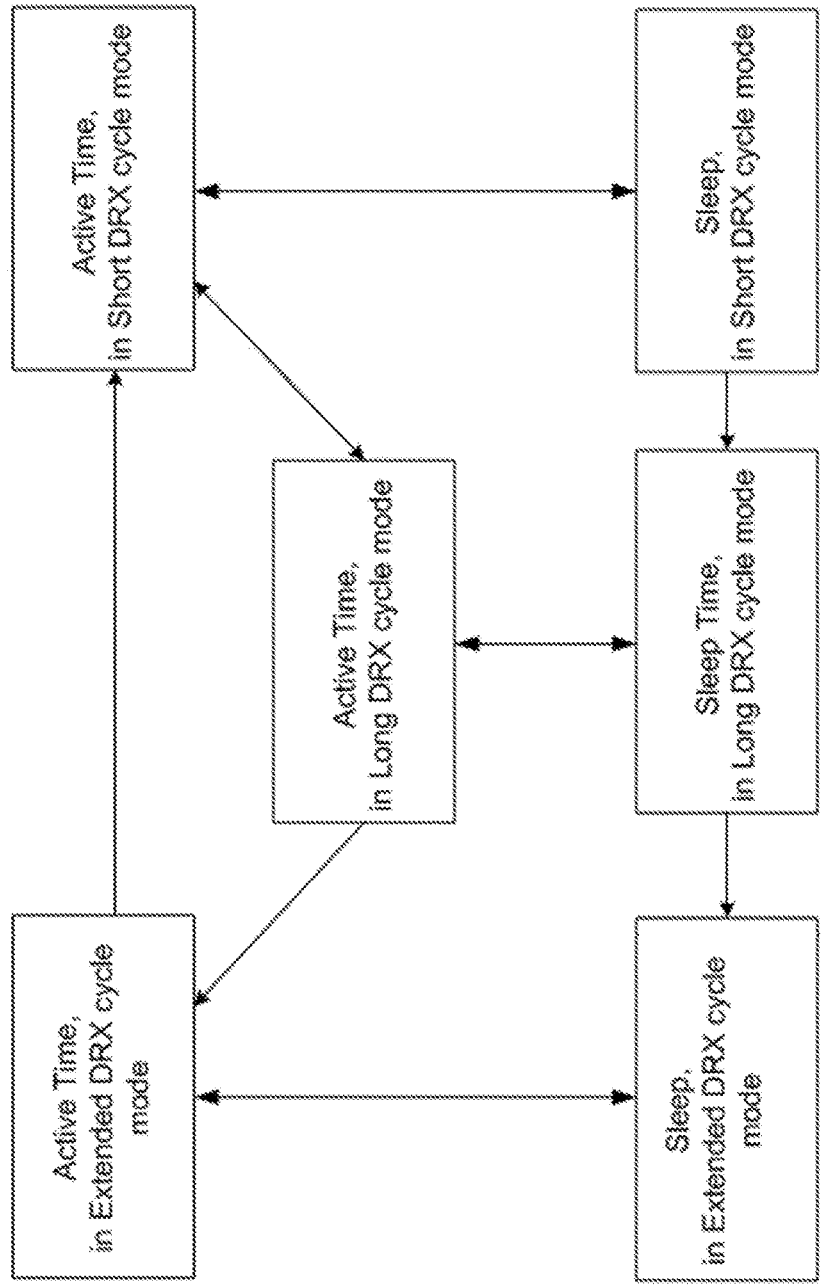
FIG. 6c illustrates exemplary DRX state changes when an extended DRX cycle mode has been configured together with both short and long DRX cycle modes.

FIG. 6b shows the case when long DRX has been configured together with extended DRX, and FIG. 6c shows the case when both short and long DRX have been configured together with extended DRX.

In some embodiments, in which embodiments an extended DRX cycle mode without periods of active time is used, the UE 310 is never in Active Time when in extended DRX cycle mode. This means that the UE 310 will sleep during the complete time period and not listen on PDCCH unless there are some other rules which require the UE 310 to listen on PDCCH. One such other rule which would require the UE 310 to listen on PDCCH is if a subframe is a paging opportunity for the UE 310, in such a subframe the UE 310 must listen on PDCCH for any paging notifications sent by the network.

Figure 6D:
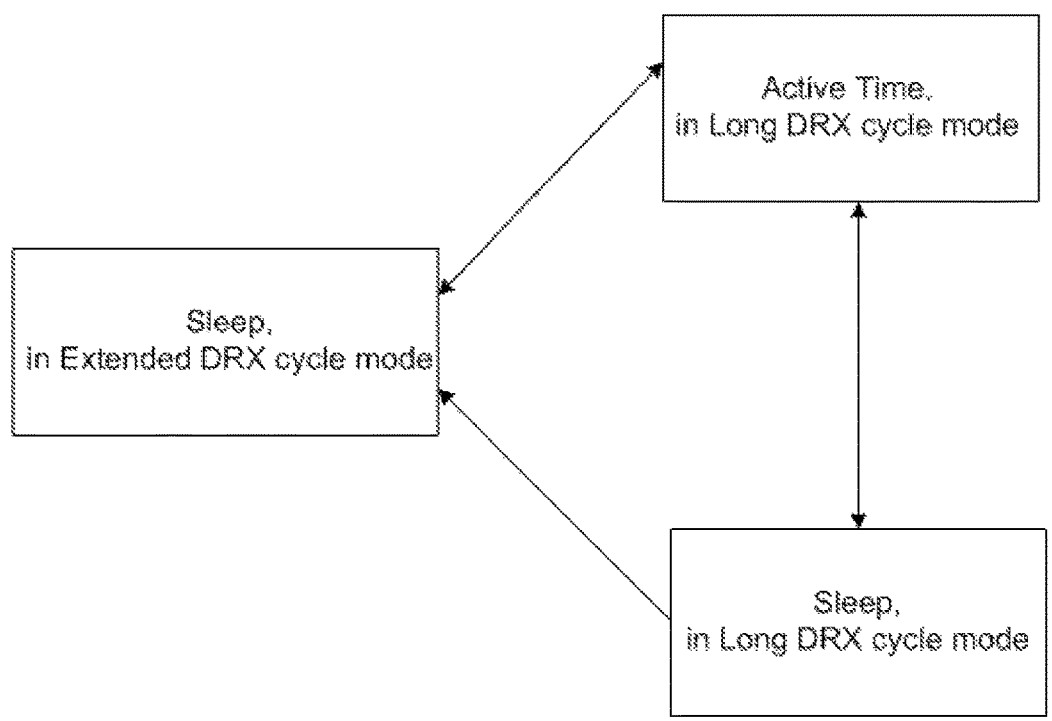
FIG. 6d illustrates another set of exemplary DRX state changes when an extended DRX cycle mode has been configured together with a long DRX cycle mode.

FIG. 6d shows the case when long DRX has been configured together with extended DRX.

Figure 6E:
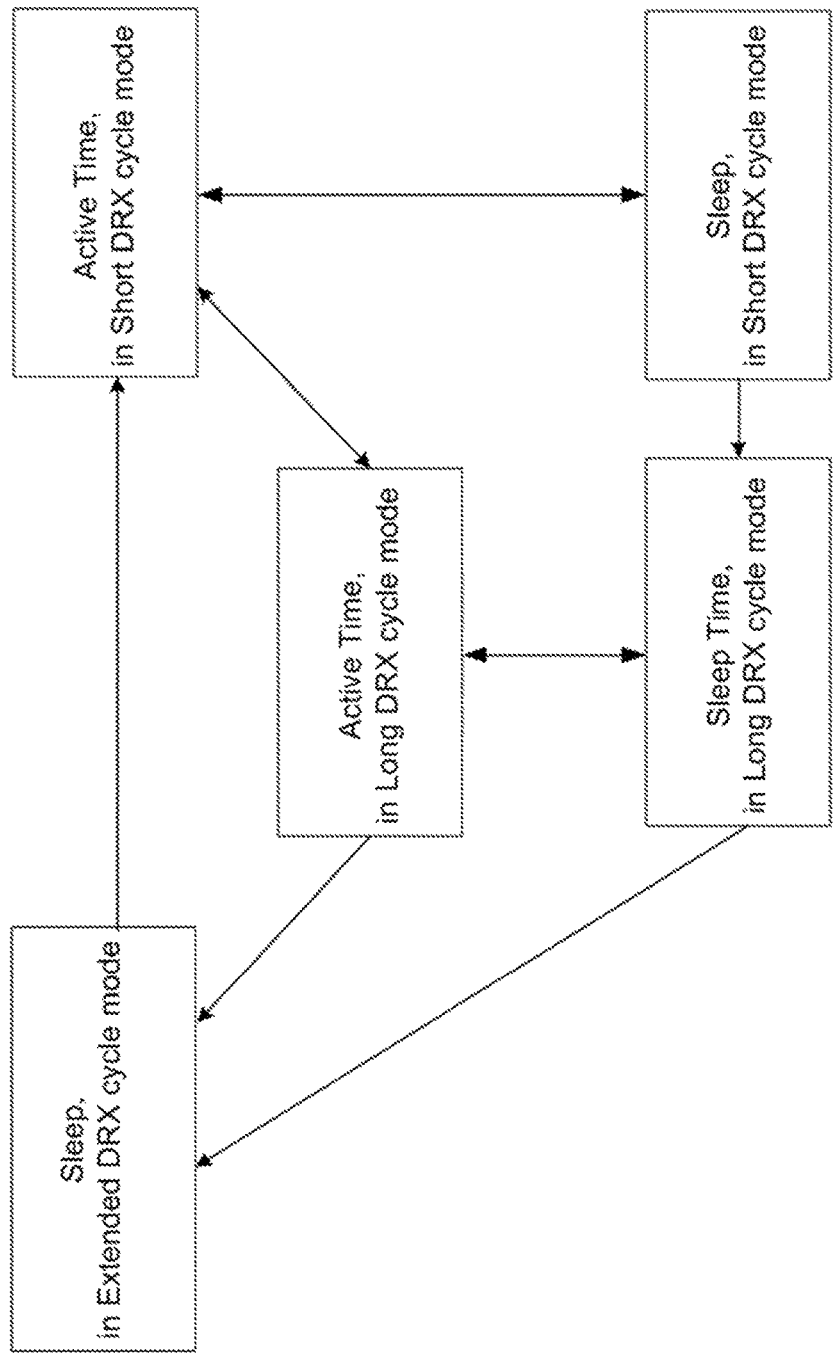
FIG. 6e illustrates another set of exemplary DRX state changes when an extended DRX cycle mode has been configured together with both short and long DRX cycle modes.

FIG. 6e shows the case when both short and long DRX have been configured together with extended DRX that is without periods of active time.

As shown in the FIGS. 6a to 6e described above, the extended DRX cycle mode is a new DRX cycle mode. The extended DRX cycle mode may be entered from long DRX cycle mode or from non DRX state according to specific rules.

According to other rules the UE 310 may leave extended DRX cycle mode and go to other DRX cycle modes or to non DRX state. One intention with the extended DRX cycle mode is that the UE 310 may move to this state to save battery and minimize signaling when it has been inactive for a certain time period.

In another embodiment the UE 310 that is using the extended DRX cycle mode will listen on PDCCH on certain subframes which are continuously repeated in cycles called the extended DRX cycles. These extended DRX cycles may either be of a fixed length or may be configured by higher layers, such as RRC.

In another embodiment at the beginning of each extended DRX cycle mode there is a time period of onDuration, where the UE 310 will be in Active Time and listen on PDCCH. This is followed by a time period where the UE 310 may enter sleep state. This extended DRX cycle is repeated infinitely until the UE 310 changes to another DRX cycle mode or goes to no DRX state.

In another embodiment during the extended DRX cycles there are specific subframe(s) where the UE 310 will be in Active Time and listen on PDCCH, and during the other subframes in the cycle the UE 310 may enter sleep state. The subframe(s) where the UE 310 will be in Active Time may be derived in different ways, such as using the same subframe as the paging opportunity for the UE 310, or one or several subframes close to the paging opportunity.

In one embodiment the extended DRX cycle length is a multiple of the long DRX cycle length. As a special case the extended DRX cycle length will be the same as the long DRX cycle length. In another embodiment the extended DRX cycle is of infinite length.

In one embodiment the UE 310 will listen to its paging opportunities when it is in extended DRX cycle mode, and if paged, the UE 310 will respond in the same way as if it has been paged when being in RRC_IDLE state.

In one embodiment a UE 310 in extended DRX cycle mode will not perform any measurements or reporting for neighboring cells, even if it has been configured to do so by RRC. Or, as a variation of this embodiment, the UE 310 may perform measurements or reporting for neighboring cells less frequently than if the UE 310 is in legacy DRX cycle mode or when in no DRX state. The frequency of reporting may for instance be decreased by a certain factor, where the factor is either a fixed value or a value that is configured by RRC.

In one embodiment a UE 310 in extended DRX cycle mode will not perform any CSI measurements, or transmissions of periodic CSI or periodic SRS.

In one embodiment a UE 310 enters extended DRX cycle mode when it has been in long DRX cycle mode for a specific time duration X, where X may be a predefined value or a configured value, and the UE 310 has not been scheduled by the network during this time. In another embodiment a UE 310 enters extended DRX cycle mode when it has been in no DRX state for a specific time duration X, where X may be a predefined value or a configured value, and the UE 310 has not been scheduled by the network during this time. Yet in another embodiment a UE 310 enters extended DRX cycle mode when it has completed X number of long DRX cycles when being in long DRX cycle mode, where X may be a predefined value or a configured value greater than or equal to 1.

In some embodiments a UE 310 enters extended DRX cycle mode when ordered to do so by the network. The network may for instance transmit a certain MAC control element to the UE 310 to order it to go to extended DRX cycle mode.

In some embodiments a UE 310 leaves extended DRX cycle mode when it is scheduled by the network in subframes where the UE 310 is in Active Time. In other embodiments a UE 310 leaves extended DRX cycle mode if it is paged by the network.

In some embodiments a UE 310 leaves extended DRX cycle mode if the UE 310 needs to perform UL transmission. The UL transmission may be performed either using a configured D-SR resource, or using a random access procedure.

In one embodiment a UE 310 will go to short DRX cycle mode when leaving extended DRX cycle mode. In another embodiment a UE 310 will go to long DRX cycle mode when leaving extended DRX cycle mode. Yet in another embodiment a UE 310 will go to no DRX state when leaving extended DRX cycle mode.

Figure 7:
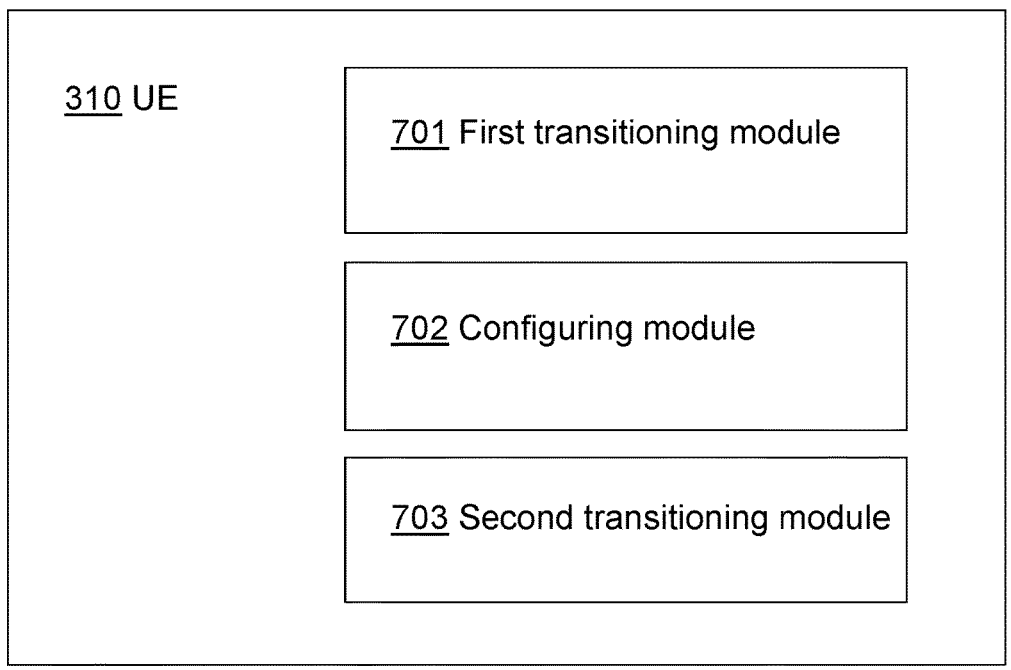
FIG. 7 is a schematic block diagram illustrating embodiments of a UE.

The UE 310 for managing an extended DRX cycle mode, as described above in relation to FIG. 4, is depicted in FIG. 7.

The UE 310 is operates in a network 300 and is in a Radio Resource Control, RRC, connected state.

The UE 310 is configured to enter the extended DRX cycle mode when a first criterion is satisfied, wherein the first criterion relates to anyone or more out of:

that the UE 310 has not been scheduled by the network during a specific time duration, that the UE 310 has completed a predefined or configured number of long DRX cycles when being in a long DRX cycle mode, that the UE 310 has received an order from the network to enter to the extended DRX cycle mode.

In some embodiments, the UE 310 comprises a first transitioning module 701, configured handle transitions into the extended DRX cycle mode. The first transitioning module 701 may be comprised in a processing circuit 806 of the UE 310, as described below in relation to FIG. 8.

In some embodiments the UE 310 is further configured to perform measurements and/or reporting less frequently when it is in the extended DRX cycle mode than when the UE 310 is in another DRX cycle mode or in no DRX state. A reporting circuit 812, as described below in relation to FIG. 8 may be used to perform the reporting.

In some embodiments, the UE 310 is further configured to periodically listen on a control or paging channel for scheduling or paging messages while in the extended DRX cycle mode. A paging circuit 810, as described below in relation to FIG. 8, may be used for listening on the paging channel.

In some embodiments, the UE 310 is further configured to adopt a terminal-controlled mobility scheme when in the extended DRX cycle mode.

In some embodiments, the UE 310 comprises a configuring module 702, arranged to handle configurations of the UE 310. The configuring module 702 may be comprised in a processing circuit 806 of the UE 310, as described below in relation to FIG. 8.

In some embodiments, the UE 310 is further configured to leave the extended DRX cycle mode when a second criterion is satisfied, wherein the second criterion relates to anyone or more out of:

that the UE 310 is scheduled by the network in subframes where the UE 310 is in Active Time, that the UE 310 needs to perform an uplink transmission, that the UE 310 is paged by the network.

In some embodiments, the UE 310 comprises a second transitioning module 703, configured handle transitions from the extended DRX cycle mode. The second transitioning module 703 may be comprised in a processing circuit 806 of the UE 310, as described below in relation to FIG. 8.

Figure 8:
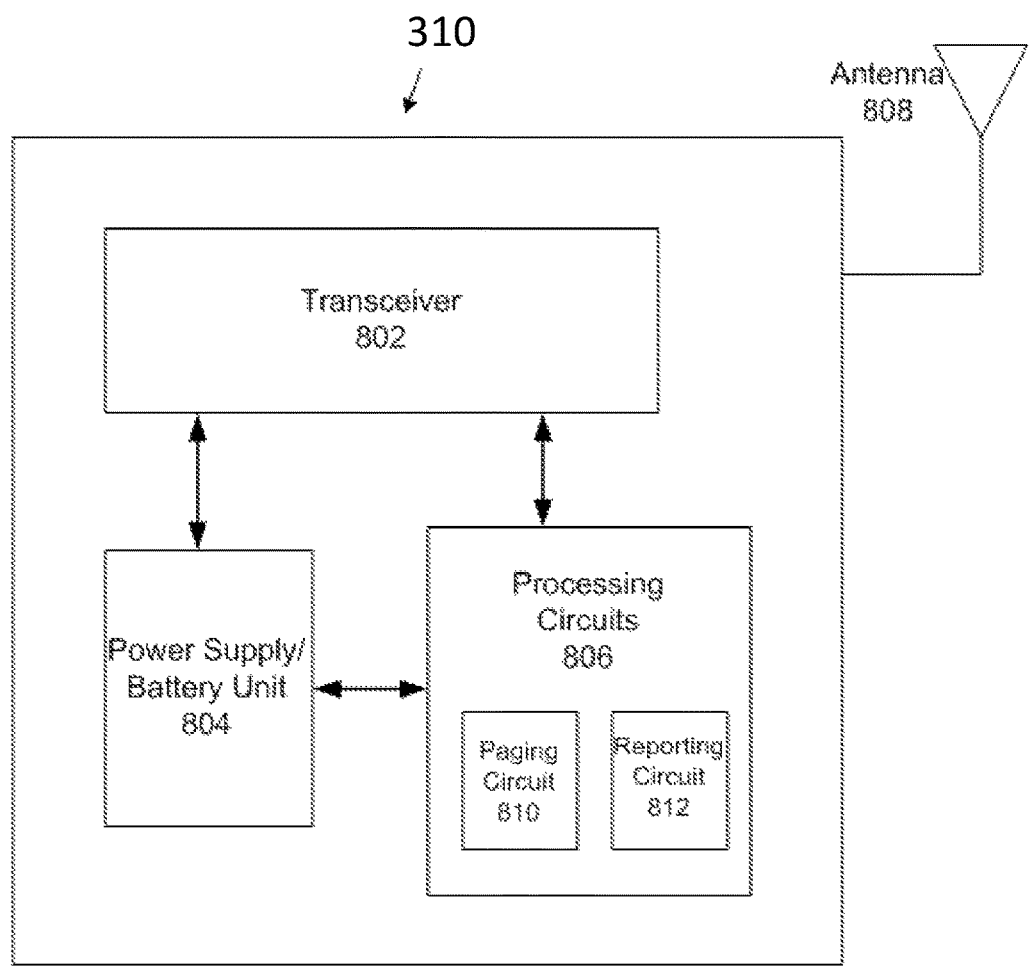
FIG. 8 illustrates an exemplary UE configured to support an extended DRX cycle mode.

FIG. 8 illustrates an exemplary UE 310 configured with an extended DRX cycle mode. The UE 310 comprises a transceiver 802, a power supply or battery unit 804, processing circuits 806 and an antenna 808. The transceiver 802 is configured to transmit and receive signals through the antenna 808. The battery unit 804 is configured to provide power to both the transceiver 802 and the processing circuits 806. The processing circuits 806 are configured to manage the state transitions of the UE 310 between an RRC_CONNECT and RRC_IDLE state and the DRX state transitions among the various DRX cycle modes and DRX states such as Sleep and Active Time. The processing circuits 806 are also configured to select a network-controlled mobility scheme or a terminal-controlled mobility scheme for the UE 310. For example, the UE 310 may adopt a terminal-controlled mobility scheme when in an extended DRX cycle mode while in an RRC_CONNECT mode. In an exemplary terminal-controlled mobility scheme, the UE 310 may stop/skip/reduce sending CSI/SRS measurement reports and neighbor cell lists to a network node 320 for mobility purposes such as handover. To that end, the processing circuits 806 are also configured to control a paging circuit 810 and a reporting circuit 812. The paging circuit 810 is configured to listen on a control/paging channel for paging messages while the UE 310 is an RRC_CONNECT or an RRC_IDLE state. The reporting circuit 812 is configured to send CSI or SRS measurement reports and neighbor cell lists to a network node 320. The reporting circuit 812 may be directed by the processing circuits 806 to stop sending measurement reports or neighbor cell lists or send less frequently.

Figure 9:
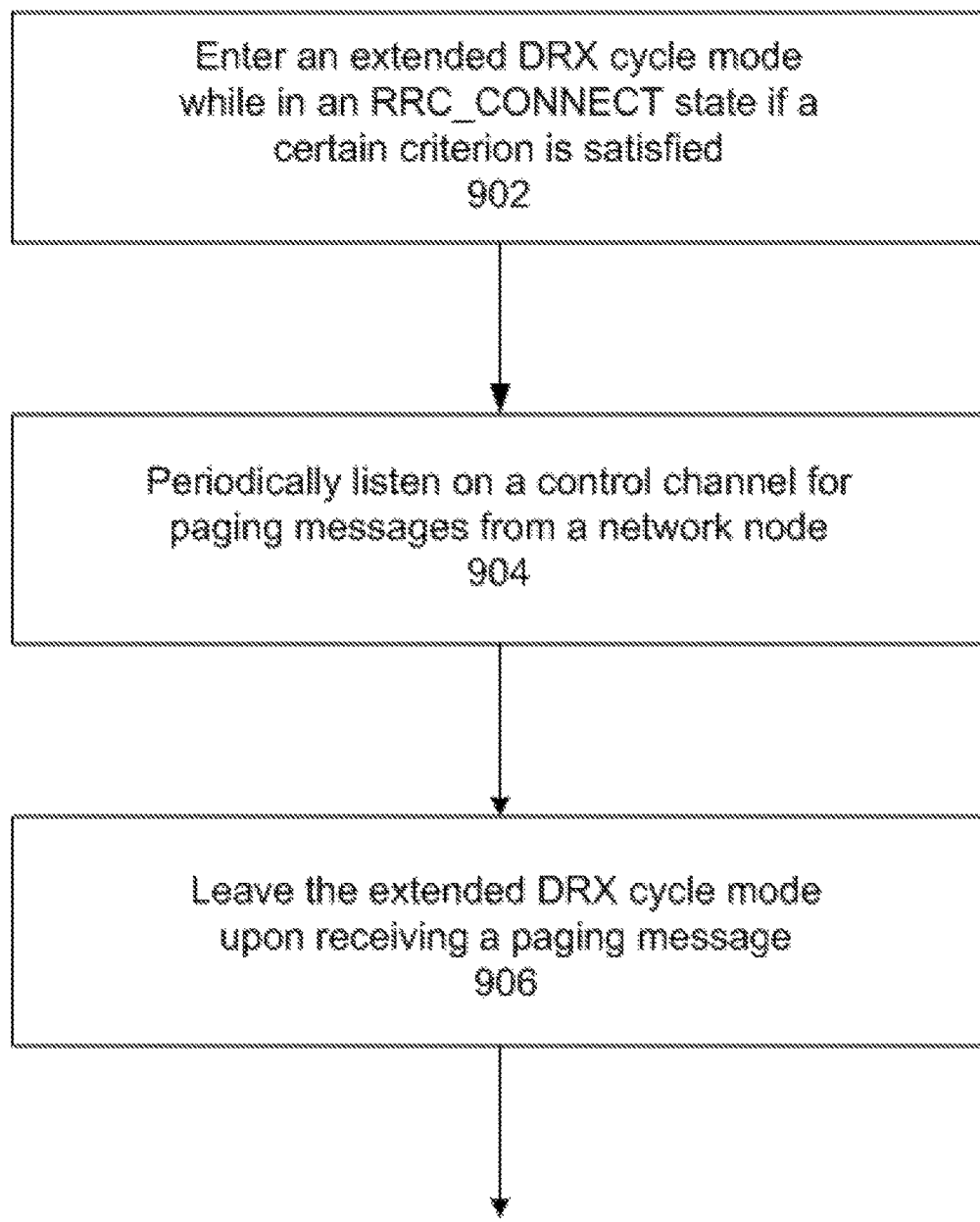
FIG. 9 illustrates a flow chart depicting a process during which a UE transitions in and out of an extended DRX cycle mode.

FIG. 9 is an exemplary flow chart depicting embodiments of a UE 310 entering and leaving an extended DRX cycle mode.

Action 902. The UE 310, while in an RRC_CONNECT state, may enter an extended DRX cycle mode when a certain criterion is satisfied. This relates to action 401 described above.

Action 904. While in the extended DRX cycle mode, the UE 310 periodically listens on a control channel for paging messages. This relates to action 402 described above.

Action 906. Upon receiving a paging message, the UE 310 leaves the extended DRX cycle mode. This relates to action 403 described above.

Figure 10:
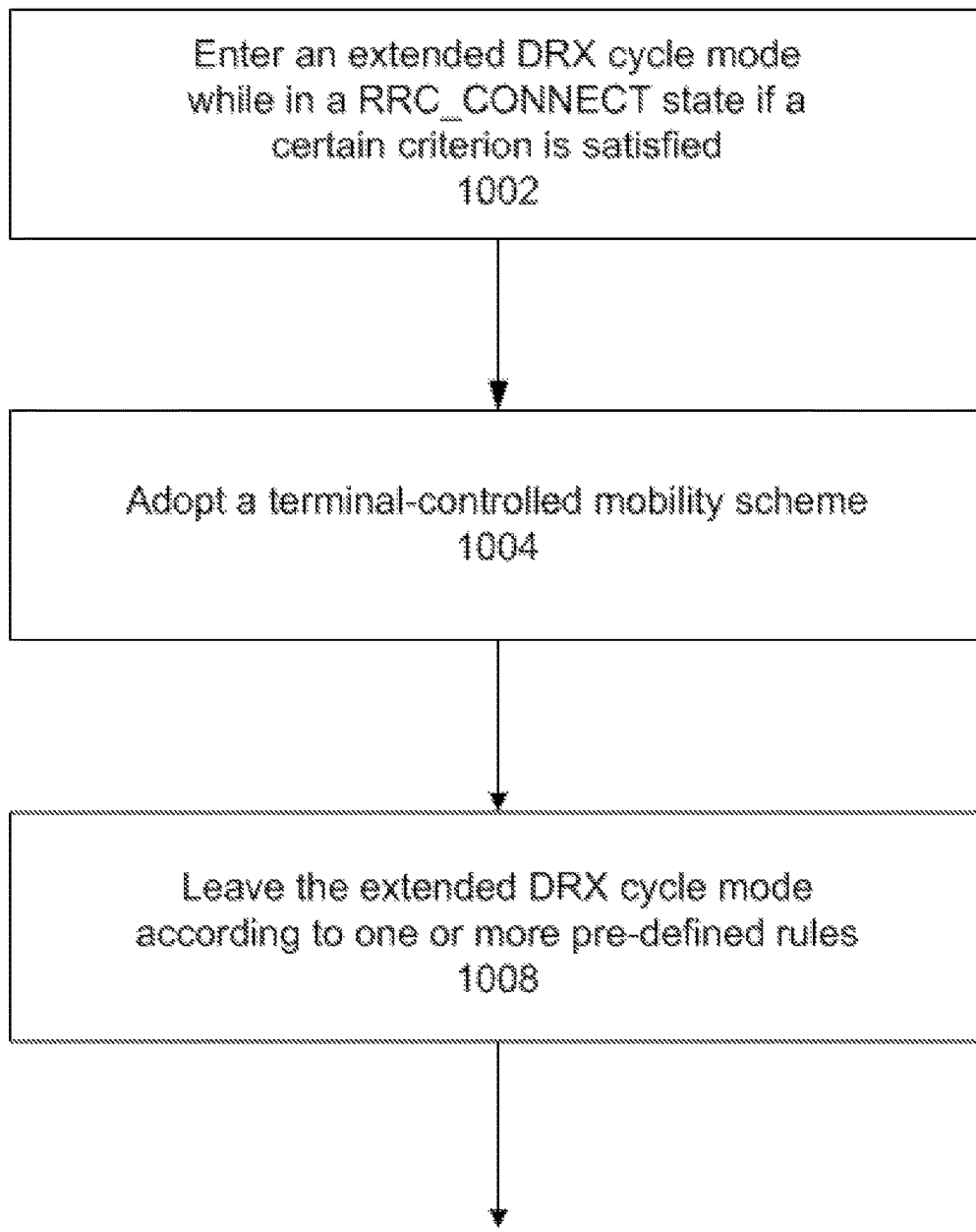
FIG. 10 illustrates another flow chart depicting a process during which a UE transitioning in and out of an extended DRX cycle mode in accordance with a set of pre-defined rules.

FIG. 10 depicts another exemplary process of a UE 310 entering and leaving an extended DRX cycle mode.

Action 1002. The UE 310, while in an RRC_CONNECT state, may enter an extended DRX cycle mode when a certain criterion is satisfied. This relates to action 401 described above.

Action 1004. In the extended DRX cycle mode, the UE 310 adopts a terminal-controlled mobility scheme. This relates to action 402 described above.

Action 1006. In accordance with one or more pre-defined rule, the UE 310 may leave the extended DRX cycle mode and enter into a legacy DRX long or short cycle mode or a non-DRX mode. This relates to action 403 described above.

Figure 11:
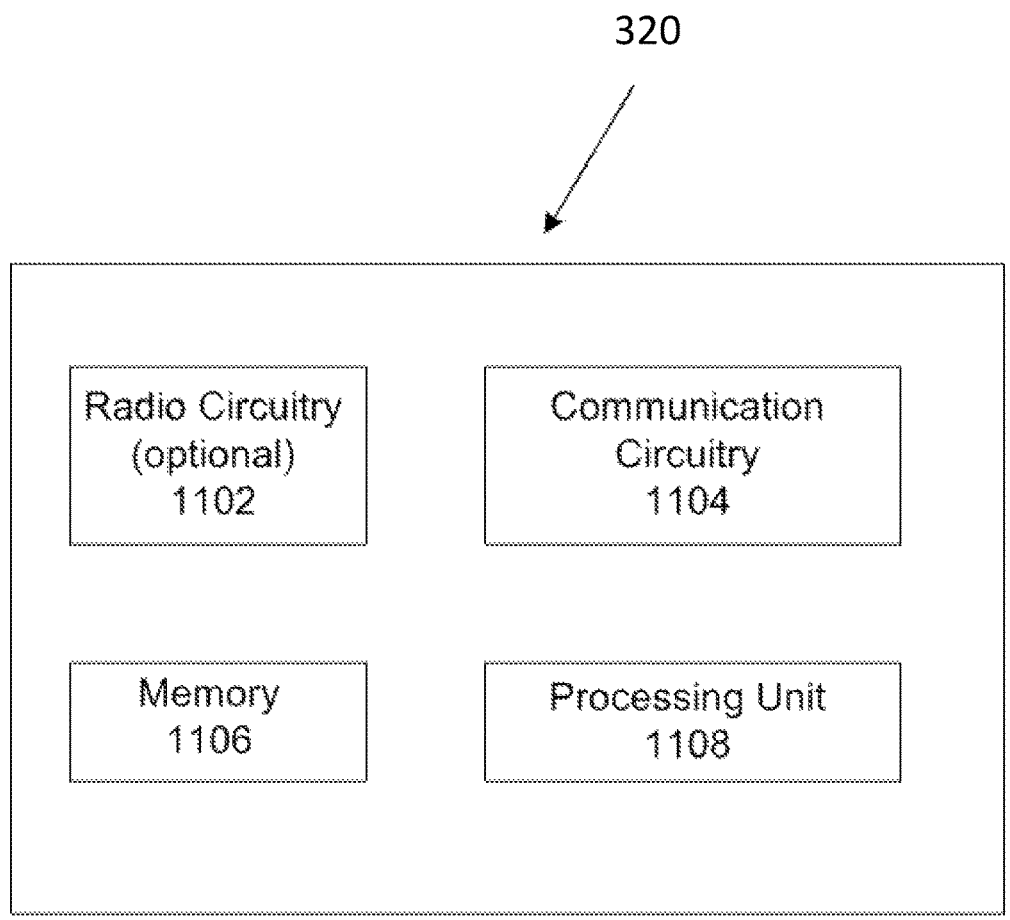
FIG. 11 illustrates an exemplary network node configured to support the techniques disclosed herein.

FIG. 11 illustrates an exemplary network node 320 comprising a radio circuitry 1102, a communication circuitry 1104, memory 1106, and a processing unit 1108. The radio circuitry 1102 may be optional and is configured to provide radio air interface with UEs 310 and other network nodes. The communication circuitry 1104 is configured to transmit and receive signals from UEs 310, peer network nodes, network controllers and gateways at the core network. The memory 1106 is configured for storing data and information. The processing unit 1108 is configured to control and manage the various components of the network node 320. The network node 320 communicates with the UE 310 in support of the DRX based mobility schemes implemented on the UE 310.

The network node 320 for managing an extended DRX cycle mode, as described above in relation to FIG. 5, is depicted in FIG. 11.

The network node 320 is configured to configure the UE 310 relating to a behavior of the UE 310 while the UE 310 is in the extended DRX cycle mode. The communication circuitry 1104 described above may be configured to send a configuration to the UE 310, in order to configure the UE 310.

In some embodiments the network node 320 is configured to configure the UE 310 to perform measurements and/or reporting less frequently than when the UE 310 is in another DRX cycle mode or in no DRX state.

In some embodiments, the network node 320 is configured to configure the UE 310 to periodically listen on a control or paging channel for scheduling or paging messages while in the extended DRX cycle mode.

In some embodiments, the network node 320 is configured to configure the UE 310 to adopt a terminal-controlled mobility scheme when in an extended DRX cycle mode.

The present invention may, of course, be carried out in other specific ways than those herein set forth without departing from the scope and essential characteristics of the invention. The present embodiments are, therefore, to be considered in all respects as illustrative and not restrictive.

ABBREVIATIONS

CSI Channel State Information
DRX Discontinuous Reception
LTE Long Term Evolution
M2M Machine-to-machine
MTC Machine Type Communication
PDCCH Physical Downlink Control Channel
RLF Radio Link Failure
RLM Radio Link Monitoring
RRM Radio Resource Management
SRS Sounding Reference Signal

The invention claimed is:

1. A method in a User Equipment (UE) for managing an extended Discontinuous Reception (DRX) cycle mode, wherein the UE is operating in a network and is in a Radio Resource Control (RRC) connected state, the method comprising:
   entering the extended DRX cycle mode when a first criterion is satisfied, wherein the first criterion relates to at least one of:
      that the UE has not been scheduled by the network during a specific time duration;
      that the UE has completed a predefined or configured number of long DRX cycles when being in a long DRX cycle mode; and
      that the UE has received an order from the network to enter to the extended DRX cycle mode.

2. The method of claim 1, further comprising, upon entering the extended DRX cycle mode, configuring the UE relating to a behavior of the UE while it is in the extended DRX cycle mode.

3. The method of claim 2, wherein the configuring comprises configuring the UE to perform measurements and/or report less frequently than when the UE is in another DRX cycle mode or in no DRX state.

4. The method of claim 2, wherein the configuring comprises configuring the UE to periodically listen on a control or paging channel for scheduling or paging messages while in the extended DRX cycle mode.

5. The method of claim 2, wherein the configuring comprises configuring the UE to adopt a terminal-controlled mobility scheme when in an extended DRX cycle mode.

6. The method of claim 1, further comprising:
   leaving the extended DRX cycle mode when a second criterion is satisfied, wherein the second criterion relates to at least one of:
      that the UE is scheduled by the network in subframes where the UE is in Active Time;
      that the UE needs to perform an uplink transmission; and
      that the UE is paged by the network.

7. A User Equipment (UE) for managing an extended Discontinuous Reception (DRX) cycle mode, wherein the UE is operating in a network and is in a Radio Resource Control (RRC) connected state, the UE comprising:
   one or more processing circuits configured to cause the UE to enter the extended DRX cycle mode when a first criterion is satisfied:
   wherein the first criterion relates to at least one of:
      that the UE has not been scheduled by the network during a specific time duration;
      that the UE has completed a predefined or configured number of long DRX cycles when being in a long DRX cycle mode; and
      that the UE has received an order from the network to enter to the extended DRX cycle mode.

8. The UE of claim 7, wherein the one or more processing circuits are configured to cause the UE to perform measurements and/or report less frequently when it is in the extended DRX cycle mode than when the UE is in another DRX cycle mode or in no DRX state.

9. The UE of claim 7, wherein the one or more processing circuits are configured to cause the UE to periodically listen on a control or paging channel for scheduling or paging messages while in the extended DRX cycle mode.

10. The UE of claim 7, wherein the one or more processing circuits are configured to cause the UE to adopt a terminal-controlled mobility scheme when in the extended DRX cycle mode.

11. The UE of claim 7, wherein the one or more processing circuits are configured to cause the UE to leave the extended DRX cycle mode when a second criterion is satisfied, wherein the second criterion relates to at least one of:
   that the UE is scheduled by the network in subframes where the UE is in Active Time;
   that the UE needs to perform an uplink transmission; and
   that the UE is paged by the network.

12. A method, in a network node, for managing an extended Discontinuous Reception (DRX) cycle mode of a User Equipment (UE), wherein the UE is in a Radio Resource Control (RRC) connected state with the network node, the method comprising:
   configuring the UE relating to a behavior of the UE while it is in the extended DRX cycle mode.

13. The method of claim 12, wherein the configuring comprises configuring the UE to perform measurements and/or report less frequently than when the UE is in another DRX cycle mode or in no DRX state.

14. The method of claim 12, wherein the configuring comprises configuring the UE to periodically listen on a control or paging channel for scheduling or paging messages while in the extended DRX cycle mode.

15. The method of claim 12, wherein the configuring comprises configuring the UE to adopt a terminal-controlled mobility scheme when in an extended DRX cycle mode.

16. A network node for managing an extended Discontinuous Reception (DRX) cycle mode of a User Equipment (UE), wherein the UE is in a Radio Resource Control (RRC) connected state with the network node, the network node comprising:
   one or more processing circuits configured to cause the network node to configure the UE relating to a behavior of the UE while the UE is in the extended DRX cycle mode.

17. The network node of claim 16, wherein the one or more processing circuits are configured to cause the network node to configure the UE to perform measurements and/or report less frequently than when the UE is in another DRX cycle mode or in no DRX state.

18. The network node of claim 16, wherein the one or more processing circuits are configured to cause the network node to configure the UE to periodically listen on a control or paging channel for scheduling or paging messages while in the extended DRX cycle mode.

19. The network node of claim 16, wherein the one or more processing circuits are configured to cause the network node to configure the UE to adopt a terminal-controlled mobility scheme when in an extended DRX cycle mode.

* * * * *